(12) United States Patent
Sun

(10) Patent No.: US 11,184,347 B2
(45) Date of Patent: *Nov. 23, 2021

(54) SECURE AUTHENTICATION USING VARIABLE IDENTIFIERS

(71) Applicant: Advanced New Technologies Co., Ltd., Grand Cayman (KY)

(72) Inventor: Chao Sun, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 17/320,625

(22) Filed: May 14, 2021

(65) Prior Publication Data

US 2021/0273936 A1 Sep. 2, 2021

Related U.S. Application Data

(63) Continuation of application No. 16/380,319, filed on Apr. 10, 2019, now Pat. No. 11,019,051, which is a
(Continued)

(30) Foreign Application Priority Data

Oct. 10, 2016 (CN) .......................... 201610884223.8

(51) Int. Cl.
*G06F 7/04* (2006.01)
*G06F 15/16* (2006.01)
(Continued)

(52) U.S. Cl.
CPC ........ *H04L 63/0815* (2013.01); *G06F 16/245* (2019.01); *G06F 21/44* (2013.01); *H04L 63/0876* (2013.01); *H04L 63/108* (2013.01)

(58) Field of Classification Search
CPC .......... G06F 21/30; G06F 21/31; G06F 21/44; G06F 16/245; H04L 63/08;
(Continued)

(56) References Cited

U.S. PATENT DOCUMENTS 8,868,921 B2 * 10/2014 Cramer ................... G06F 21/34
713/184
9,203,818 B1 * 12/2015 Roth ....................... H04L 63/08
(Continued)

FOREIGN PATENT DOCUMENTS

CN 101064695 10/2007
CN 101605030 12/2009
(Continued)

OTHER PUBLICATIONS

Crosby et al., "BlockChainTechnology: Beyond Bitcoin," Sutardja Center for Entrepreneurship & Technology Technical Report, Oct. 16, 2015, 35 pages.
(Continued)

*Primary Examiner* — Amie C. Lin
(74) *Attorney, Agent, or Firm* — Fish & Richardson P.C.

(57) ABSTRACT

This specification provides techniques for secure authentication. One example method includes receiving a login request from a computing device, wherein the login request includes a variable apparatus identifier (ID) associated with the computing device; in response to receiving the login request, determining that the variable apparatus ID corresponds to a user account; in response to determining that the variable apparatus ID corresponds to a user account, determining that an update of the variable apparatus ID is requested based on a timestamp included in the variable apparatus ID and a current time; in response to determining that the update of the variable apparatus ID is requested, generating an updated variable apparatus ID associated with
(Continued)

the computing device; and transmitting an account login permission instruction and the updated variable apparatus ID to the computing device.

18 Claims, 6 Drawing Sheets

Related U.S. Application Data continuation of application No. PCT/CN2017/103390, filed on Sep. 26, 2017.

(51) Int. Cl.
    *G06F 17/30*     (2006.01)
    *H04L 29/06*     (2006.01)
    *G06F 16/245*     (2019.01)
    *G06F 21/44*     (2013.01)

(58) Field of Classification Search
CPC ............ H04L 63/0815; H04L 63/0846; H04L 63/0876; H04L 63/108
See application file for complete search history.

(56) References Cited

U.S. PATENT DOCUMENTS

| | | | |
|---|---|---|---|
| 10,445,477 B2 | 10/2019 | Ito | |
| 2010/0106771 A1* | 4/2010 | Park | G06F 15/16 709/203 |
| 2011/0162051 A1 | 6/2011 | Li et al. | |
| 2014/0082710 A1 | 3/2014 | Lu et al. | |
| 2014/0250490 A1 | 9/2014 | Baca et al. | |
| 2014/0304786 A1* | 10/2014 | Pei | H04L 63/0876 726/6 |
| 2015/0106905 A1 | 4/2015 | Fang | |
| 2015/0199505 A1 | 7/2015 | Jo et al. | |
| 2015/0208234 A1 | 7/2015 | Mohajeri | |
| 2016/0080367 A1 | 3/2016 | Roth et al. | |
| 2016/0112426 A1 | 4/2016 | Nguyen et al. | |
| 2017/0085522 A1 | 3/2017 | Greene | |
| 2017/0147772 A1* | 5/2017 | Meehan | G16H 40/63 |
| 2018/0048647 A1* | 2/2018 | Favila | H04L 63/0876 |
| 2019/0238529 A1 | 8/2019 | Chao | |

FOREIGN PATENT DOCUMENTS

| | | |
|---|---|---|
| CN | 101964791 | 2/2011 |
| CN | 102739686 | 10/2012 |
| CN | 103457738 | 12/2013 |
| CN | 104348620 | 2/2015 |
| CN | 104580074 | 4/2015 |
| CN | 104580177 | 4/2015 |
| CN | 104580496 | 4/2015 |
| CN | 104821937 | 8/2015 |
| CN | 105205384 | 12/2015 |
| CN | 105210076 | 12/2015 |
| CN | 105978682 | 9/2016 |
| CN | 107026832 | 8/2017 |
| JP | 2003157366 | 5/2003 |
| JP | 2015215663 | 12/2015 |
| KR | 20140142852 | 12/2014 |
| TW | I344607 | 7/2011 |
| WO | WO 2016155668 | 10/2016 |

OTHER PUBLICATIONS

European Extended Search Report in European Patent Application No. 17860687.7, dated Sep. 30, 2019, 7 pages.
International Preliminary Report on Patentability in International Application No. PCT/CN2017/103390, dated May 21, 2019, 10 pages (with English Translation).
International Search Report and Written Opinion in International Application No. PCT/CN2017/103390, dated Nov. 30, 2017, 14 pages (with English translation).
Nakamoto, "Bitcoin: A Peer-to-Peer Electronic Cash System," www.bitcoin.org, 2005, 9 pages.

* cited by examiner

SECURE AUTHENTICATION USING VARIABLE IDENTIFIERS

CROSS-REFERENCE TO RELATED APPLICATIONS

This application is a continuation of U.S. patent application Ser. No. 16/380,319, filed on Apr. 10, 2019, which is a continuation of PCT Application No. PCT/CN2017/103390, filed on Sep. 26, 2017, which claims priority to Chinese Patent Application No. 201610884223.8, filed on Oct. 10, 2016, and each application is hereby incorporated by reference in its entirety.

TECHNICAL FIELD

The present application relates to the field of network communications technologies, and in particular, to a method, apparatus and server for account login.

BACKGROUND

With development of Internet technologies, applications (app) based on mobile apparatuses are continuously developed and widely used. Login of a personal account is involved in many scenarios when using various apps. What's more, after login for the first time, a user can automatically log in to the user's account in subsequent operations.

There are mainly two existing methods for account login. In one method, the mobile apparatus sends, to a server, a user name and a password that are entered by the user, to store the user name and the password in the server. In addition, the mobile apparatus stores, in the mobile apparatus, the user name and an apparatus identifier (ID) corresponding to the mobile apparatus. In this case, when the user starts the app again, the mobile apparatus sends the apparatus ID and the user name to the server for verification, and automatically logs in to the account after the verification succeeds.

In the other method, after the user successfully performs login for the first time, a server sends, to the mobile apparatus, a token corresponding to the mobile apparatus, and the mobile apparatus receives and stores the apparatus token. When the user starts the app again, the mobile apparatus sends the apparatus token to the server, and the server verifies the apparatus token. If the verification succeeds, the mobile apparatus automatically logs in to the account.

It can be seen that, in both the two existing methods, the apparatus ID/token is permanently stored in the mobile apparatus, and is easy to be cracked, causing security risks.

SUMMARY

A main objective of the present application is to alleviate the previous problem.

According to an aspect of the present application, a method for account login is provided, where the method for account login is applied to a server and includes: receiving a login request from a mobile apparatus, where the login request includes a variable apparatus identifier (ID); searching a user account database for user account information corresponding to the variable apparatus ID; if identifying the user account information corresponding to the variable apparatus ID, determining, based on a timestamp in the variable apparatus ID and a current time of the server, whether the variable apparatus ID needs to be updated; if the variable apparatus ID needs to be updated, updating the variable apparatus ID; and sending an account login permission instruction and an updated variable apparatus ID to the mobile apparatus.

According to another aspect of the present application, a method for account login is provided, where the method for account login is applied to a server and includes: receiving a login request from a mobile apparatus, where the login request includes a variable apparatus ID; searching a user account database for user account information corresponding to the variable apparatus ID; if identifying the user account information corresponding to the variable apparatus ID, updating the variable apparatus ID; and sending an account login permission instruction and an updated variable apparatus ID to the mobile apparatus.

According to another aspect of the present application, a method for account login is provided, where the method for account login is applied to a mobile apparatus and includes: sending a login request to a server, where the login request includes a variable apparatus ID; and receiving, from the server, a variable apparatus ID processed by the server and an account login permission instruction.

According to another aspect of the present application, a server is provided, including: a receiving unit, configured to receive a login request from a mobile apparatus, where the login request includes a variable apparatus ID; a storage unit, configured to store a user account database; a searching unit, configured to search the user account database for user account information corresponding to the variable apparatus ID; a determining unit, configured to determine, based on a timestamp in the variable apparatus ID and a current time of the server, whether the variable apparatus ID needs to be updated; and an update unit, configured to update the variable apparatus ID.

According to another aspect of the present application, an apparatus for account login is provided, including: a sending unit, configured to send a login request to a server, where the login request includes a variable apparatus ID; and a receiving unit, configured to receive, from the server, a variable apparatus ID processed by the server and an account login permission instruction.

In at least one of the technical solutions used in the implementations of the present application, a variable apparatus ID is used to replace a unique and invariable apparatus ID for automatic login, so that security is improved.

BRIEF DESCRIPTION OF DRAWINGS

The accompanying drawings described here are intended to provide a further understanding of the present application, and constitute a part of the present application. The illustrative implementations of the present application and descriptions thereof are intended to describe the present application, and constitute no limitation on the present application. In the accompanying drawings.

DESCRIPTION OF IMPLEMENTATIONS

Figure 1:
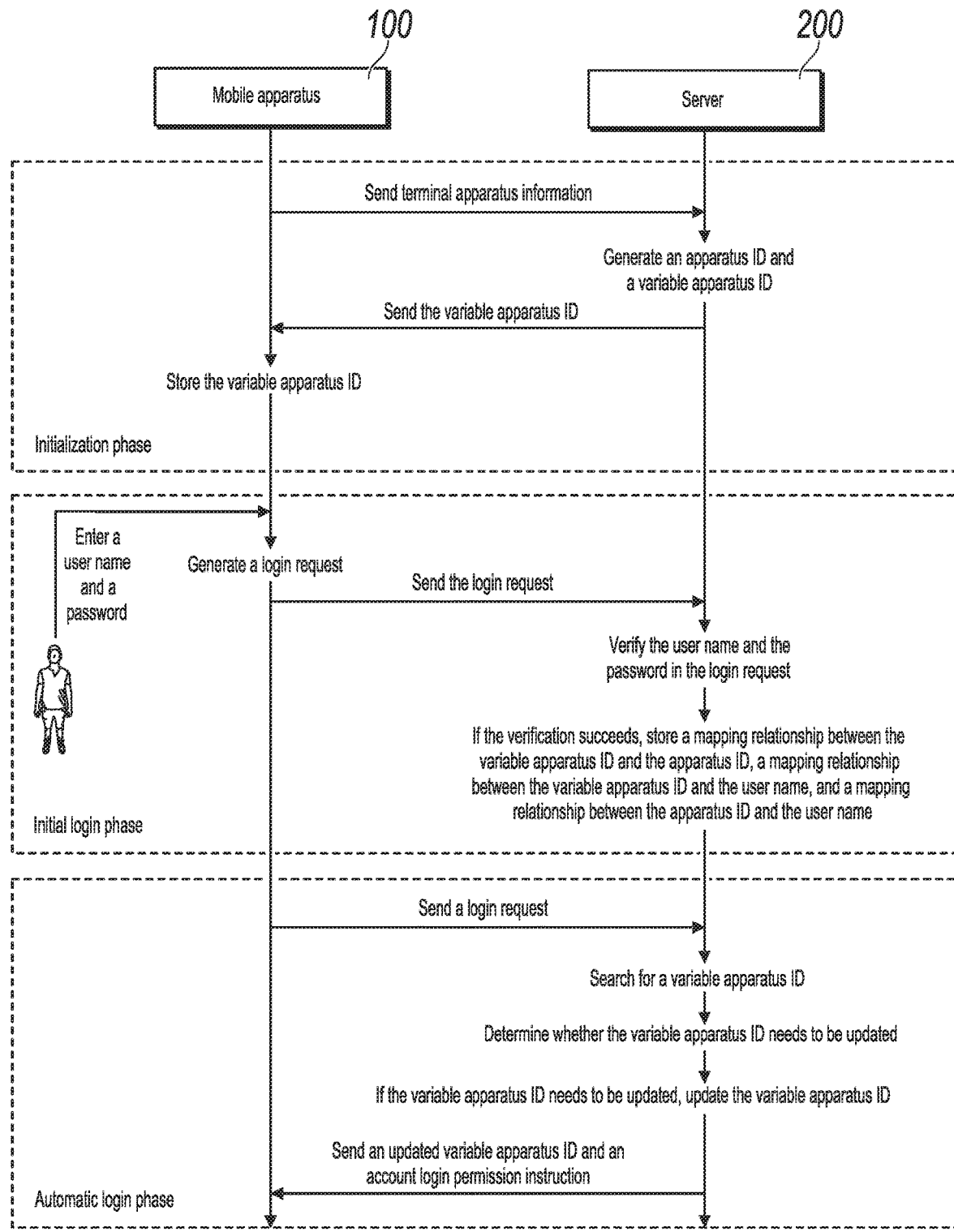
FIG. 1 is a schematic diagram illustrating a system for account login, according to an example implementation of the present application.

To make the objectives, technical solutions, and advantages of the present application clearer, the following comprehensively describes the technical solutions of the present application with reference to specific implementations and accompanying drawings of the present application. Apparently, the described implementations are merely some rather than all of the implementations of the present application. All other implementations obtained by a person of ordinary skill in the art based on the implementations of the present application without creative efforts shall fall within the protection scope of the present application.

For ease of description below, terms used in various implementations of the present application are first described.

A mobile apparatus is usually an apparatus used by a user in a network system to communicate with a server. The mobile apparatus in the present application can include but is not limited to any of the following apparatuses: a personal computer (PC), a mobile device (such as a cellular phone, a personal digital assistant (PDA), a digital camera, a portable game console, an MP3 player, a portable/personal media player (PMP), an eReader, a tablet PC, a portable PC, or a Global Positioning System (GPS) navigator), a smart TV, etc.

An application (app) is an embedded app or a third-party app that is stored in a storage unit of a mobile apparatus. The embedded app is an app that is pre-installed on the mobile apparatus. For example, the embedded app can be a browser, an email, an instant messaging app, etc. There are a variety of third-party apps which are downloaded from the online stores and installed on the mobile apparatus, such as a payment app, a shopping app, and an entertainment app.

An apparatus identifier (ID) is a permanently-valid and invariable ID generated based on attribute information of a mobile apparatus and a specific algorithm model. Attribute information of a mobile apparatus based on an Android operating system can include information such as an international mobile equipment identity (IMEI), an Android ID, a MAC address, and a serial number (SN). Attribute information of a mobile apparatus based on an iOS operating system can include information such as an advertising identifier (IDFA) and a vendor identifier (vendor ID). Generally, the apparatus ID cannot be cracked reversely. A mobile apparatus usually has a unique apparatus ID. Therefore, different mobile apparatuses have different apparatus IDs.

A variable apparatus ID (such as an apparatus token) is an ID generated by a mobile apparatus based on information such as an apparatus ID, an app name, a random number, and a timestamp (used to uniquely identify a certain moment). It can be seen that one variable apparatus ID corresponds to one apparatus ID, and a plurality of variable apparatus IDs with different validity periods can be generated by using one apparatus ID. In actual applications, a timestamp can be parsed out from a variable apparatus ID by using a specific parsing method, to determine whether the variable apparatus ID is valid. Different validity periods can be set for different apps. Therefore, different apps in the same mobile apparatus can correspond to different variable apparatus IDs.

According to an implementation of the present application, a system for automatic login is provided.

FIG. 1 illustrates a system for automatic login, according to an example implementation of the present application. As shown in FIG. 1, the system includes a mobile apparatus 100 and a server 200. The system includes three phases: A first phase is an initialization phase which is also referred to as a registration phase; a second phase is an initial login phase; and a third phase is an automatic login phase. The three phases are described in detail below with reference to FIG. 1.

In the initialization phase, a user starts an app stored in the mobile apparatus 100 for the first time. For example, in response to the user's touch on an app icon (such as an ALIPAY app or a QQ app) displayed on a display unit, the mobile apparatus 100 sends terminal apparatus information to the server 200. The terminal apparatus information includes hardware information and software information. Subsequently, the server 200 generates a unique apparatus ID based on the terminal apparatus information. For example, the server 200 can generate the apparatus ID of the mobile apparatus 100 based on an IDFA or an SN of the mobile apparatus, and generate, based on the apparatus ID, a variable apparatus ID (such as an apparatus token) corresponding to the app. Specifically, the server 200 generates the variable apparatus ID based on information such as app information corresponding to the app, a predetermined validity period, and a timestamp. The server 200 stores a mapping relationship between the apparatus ID and the variable apparatus ID in a user account database of the server 200, and sends the variable apparatus ID to the mobile apparatus 100. The mobile apparatus 100 stores the variable apparatus ID in a memory of the mobile apparatus 100. Then, the system enters the initial login phase.

In an alternative implementation, variable apparatus IDs with different validity periods can be set for different apps based on types of the apps. For example, when the app is an app such as a payment or instant messaging app that requires higher security, the validity period of the variable apparatus ID can be set to be shorter. When the app is an app such as a news or video app, the validity period of the variable apparatus ID can be set to be longer.

The user enters a user name and a password on the mobile apparatus. The mobile apparatus generates a login request based on the stored variable apparatus ID and the user name and password that are entered by the user, and sends the login request to the server 200. The server verifies the user name and the password. If the verification fails, the server returns, to the mobile apparatus, information for entering account information again, until the verification succeeds. If the verification succeeds, the server 200 stores the mapping relationship between the apparatus ID and the variable apparatus ID, a mapping relationship between the variable apparatus ID and the user name, and a mapping relationship between the apparatus ID and the user name in the user account database of the server 200. Then, the system enters the automatic login phase in response to the user's re-login to the app.

When the user starts the app again, the mobile apparatus 100 generates a login request only based on a variable apparatus ID, and sends the login request to the server 200. The server 200 searches, based on the variable apparatus ID in the login request, for an apparatus ID corresponding to the variable apparatus ID. If identifying the apparatus ID corresponding to the variable apparatus ID, the server 200 sends, to the mobile apparatus 100, information that is successfully verified by the server 200. After receiving the information, the mobile apparatus 100 automatically logs in to a corresponding account. If not identifying the apparatus ID corresponding to the variable apparatus ID, the server 200 sends, to the mobile apparatus 100, information that fails to be verified by the server 200. After receiving the information, the mobile apparatus 100 returns to the second phase (namely, the initial login phase).

In an alternative implementation, when the user starts the app again, the mobile apparatus 100 generates a login request based on a variable apparatus ID and a user name, and sends the login request to the server 200. The server 200 determines, based on the variable apparatus ID in the login request, an apparatus ID corresponding to the variable apparatus ID, and determines whether the user name in the login request is a user name corresponding to the apparatus ID. If an apparatus ID corresponding to the variable apparatus ID in the login request does not exist in the user account database of the server 200, the system exits the automatic login phase and enters the initial login phase. If an apparatus ID corresponding to the variable apparatus ID in the login request exists in the user account database of the server 200, but a user name corresponding to the apparatus ID is inconsistent with the stored user name, it indicates that the user logs in to another account by using the mobile apparatus 100. In this case, the system enters the initial login phase. The user needs to enter a user name and a password. Subsequently, the mobile apparatus 100 generates an updated login request based on the user name, the password, and the variable apparatus ID, and sends the updated login request to the server 200. After successfully verifying the information, the server sets a mapping relationship between the user name and the apparatus ID. It can be seen that one apparatus ID can correspond to a plurality of user names. Therefore, to log in to an expected account, the mobile apparatus can generate a login request based on a user name and a variable apparatus ID.

If an apparatus ID corresponding to the variable apparatus ID in the login request exists in the user account database of the server 200, and a user name corresponding to the apparatus ID is consistent with the stored user name, the mobile apparatus logs in to the account.

Next, the server 200 can determine, based on a timestamp in the variable apparatus ID and a current time of the server, whether the variable apparatus ID needs to be updated. Specifically, the server 200 can parse out the timestamp from the variable apparatus ID, and determine, based on the timestamp, whether the variable apparatus ID is within the validity period. For example, the server 200 can perform calculation based on the timestamp and the current time of the server to determine how long the variable apparatus ID has been created, and then determine whether the variable apparatus ID is within the validity period. If the variable apparatus ID is not within the validity period, the server 200 generates an updated variable apparatus ID. The server 200 can generate the updated variable apparatus ID based on the current time of the server. Then, the server 200 sends the updated variable apparatus ID and an account login permission instruction to the mobile apparatus 100. The mobile apparatus 100 stores the updated variable apparatus ID in the memory of the mobile apparatus 100 for automatic login next time.

In an alternative implementation, the server 200 can generate an updated variable apparatus ID based on the received variable apparatus ID when identifying the user account information corresponding to the variable apparatus ID; the server 200 can further update, by using the updated variable apparatus ID, the variable apparatus ID stored in the server 200; and send the updated variable apparatus ID to the mobile apparatus 100.

In an alternative implementation, the mobile apparatus 100 can combine the initialization phase with the login phase. Specifically, in response to a user name and a password that are entered by the user on the mobile apparatus, the mobile apparatus 100 generates a login request based on the user name and the password that are entered by the user, and then the mobile apparatus 100 sends terminal apparatus information and the login request to the server 200 together. The terminal apparatus information includes hardware information and software information. The server verifies the user name and the password. If the verification fails, the server returns, to the mobile apparatus, information for entering account information again, until the verification succeeds. If the verification succeeds, the server generates an apparatus ID based on the terminal apparatus information, and generates a variable apparatus ID based on the generated apparatus ID. Then, the server 200 stores, in a memory, a mapping relationship between the apparatus ID and the variable apparatus ID, a mapping relationship between the variable apparatus ID and the user name, and a mapping relationship between the apparatus ID and the user name.

When the user starts the app again, the system enters the third phase (namely, the automatic login phase). Detailed are omitted here for simplicity.

Figure 2:
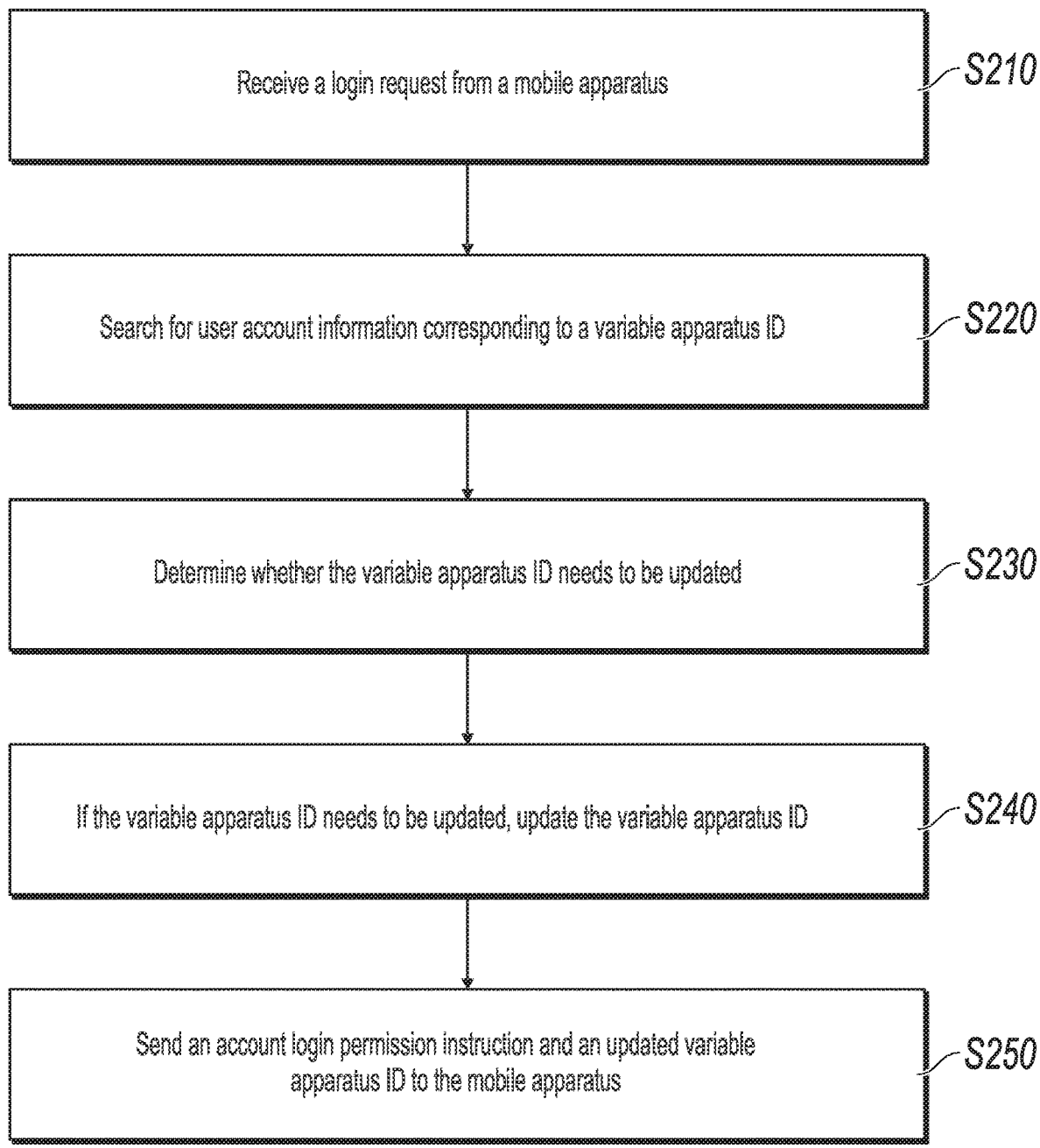
FIG. 2 is a flowchart illustrating a method for account login executed by a server, according to an example implementation of the present application.
Figure 3:
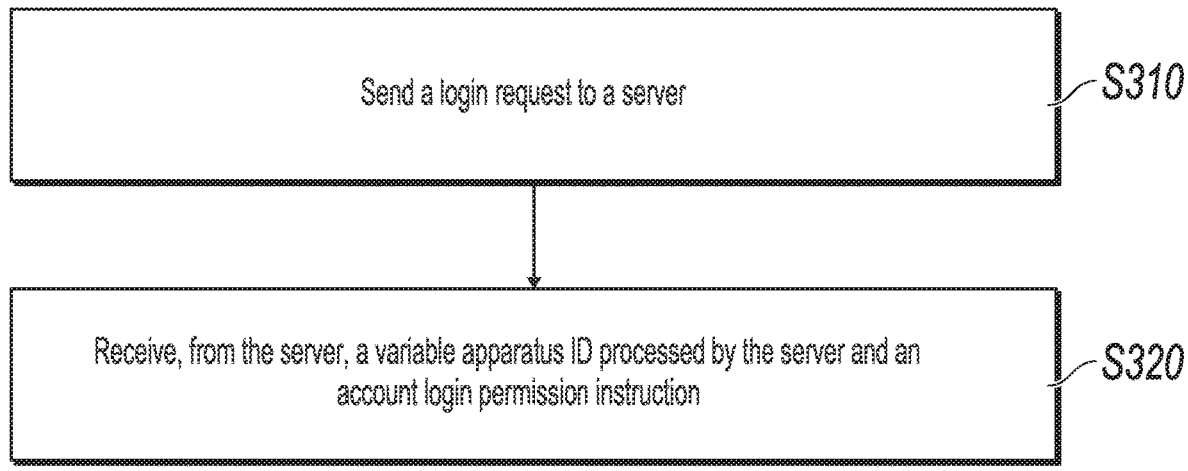
FIG. 3 is a flowchart illustrating a method for account login executed by a mobile apparatus, according to an example implementation of the present application.

With reference to FIG. 2 and FIG. 3, the following separately describes a method for account login executed by a server and a method for account login executed by a mobile apparatus. FIG. 2 is a flowchart illustrating a method for account login executed by a server, according to an example implementation of the present application. FIG. 3 is a flowchart illustrating a method for account login executed by a mobile apparatus, according to an example implementation of the present application.

Referring to FIG. 2, in S210, a server receives a login request from a mobile apparatus, where the login request includes a variable apparatus ID (such as an apparatus token). The variable apparatus ID is generated by the server based on an apparatus ID when a user logs in to an account for the first time. The apparatus ID is a unique ID generated by the server based on terminal apparatus information received from the mobile apparatus. Specifically, the variable apparatus ID is generated based on the generated apparatus ID and information such as a time of making the login request, an app that the user expects to log in to, and a predetermined timestamp. As such, the variable apparatus ID can include app information corresponding to the app that the user expects to log in to, a validity period, and a timestamp. In an optional implementation, the login request includes a variable apparatus ID and a user name.

Next, in S220, the server searches a user account database for user account information corresponding to the variable apparatus ID. The user account database stores a user ID corresponding to the variable apparatus ID. Specifically, when the user logs in to an account in an app for the first time, the mobile apparatus sends account information (namely, a user name and a password) and terminal apparatus information to the server. The server verifies the account information. After the verification succeeds, the server generates an apparatus ID based on the terminal apparatus information, and generates, based on the apparatus ID, a variable apparatus ID corresponding to the app. Then, the server stores a mapping relationship between the variable apparatus ID and the apparatus ID, a mapping relationship between the variable apparatus ID and the user name in the user account database, and a mapping relationship between the apparatus ID and the user name. In an optional implementation, the server can send terminal apparatus information to the server when the user starts the app for the first time. Then, the server generates an apparatus ID based on the terminal apparatus information, and generates a variable apparatus ID based on the apparatus ID. After the user logs in to the account for the first time and verification performed by the server succeeds, the server stores, in the user account database, a mapping relationship between the account information and the variable apparatus ID, a mapping relationship between the variable apparatus ID and the apparatus ID, and a mapping relationship between the account information and the apparatus ID.

When the login request includes only a variable apparatus ID, the server searches the user account database for an apparatus ID corresponding to the variable apparatus ID. When the login request includes a variable apparatus ID and a user name, the server can search the user account database for an apparatus ID corresponding to the variable apparatus ID, and determine whether the user name is a user name corresponding to the apparatus ID.

If identifying the user account information corresponding to the variable apparatus ID, the server performs S230, that is, the server determines, based on a timestamp in the variable apparatus ID and a current time of the server, whether the variable apparatus ID needs to be updated. The server determines whether the variable apparatus ID is within the validity period; if the variable apparatus ID is within the validity period, the server does not make any change; or if the variable apparatus ID is not within the validity period, the server generates an updated variable apparatus ID based on the variable apparatus ID. Specifically, the server can determine a survival period of the variable apparatus ID based on the timestamp in the variable apparatus ID and the current time of the server, and compare the survival period with the validity period. If the survival period is shorter than the validity period, the server does not make any change; or if the survival period is not shorter than the validity period, the server generates an updated variable apparatus ID.

In an alternative implementation, the server can generate an updated variable apparatus ID based on the received variable apparatus ID when identifying the user account information corresponding to the variable apparatus ID; update, by using the updated variable apparatus ID, the variable apparatus ID stored in the server; and send the updated variable apparatus ID to the mobile apparatus.

If the user account information corresponding to the variable apparatus ID is not identified, the verification fails. The server sends, to the mobile apparatus, an instruction indicating that the verification fails. After receiving the instruction, the mobile apparatus displays a login interface and prompts the user to enter account information again.

If the server determines, in S230, that the variable apparatus ID needs to be updated, the server updates the variable apparatus ID in S240. Finally, in S250, the server sends an account login permission instruction and the updated variable apparatus ID to the mobile apparatus. After receiving the updated variable apparatus ID, the mobile apparatus deletes a variable apparatus ID stored in a memory, and stores the updated variable apparatus ID in the memory. If determining that the variable apparatus ID does not need to be updated, the server sends an account login permission instruction and the variable apparatus ID to the mobile apparatus.

The method for account login executed by the server has been described above. Subsequently, a method for account login executed by a mobile apparatus is described with reference to FIG. 3.

Referring to FIG. 3, when an app installed on a mobile apparatus is started again, in S310, the mobile apparatus sends a login request to a server, where the login request includes a variable apparatus ID, and the variable apparatus ID has a predetermined validity period and can identify the mobile apparatus. The mobile apparatus sends terminal apparatus information of the mobile apparatus to the server in an initialization phase or an initial login phase. The terminal apparatus information includes hardware information and software information. Subsequently, the server generates, based on the terminal apparatus information, a unique apparatus ID and a variable apparatus ID (such as an apparatus token) corresponding to the apparatus ID. Specifically, the server can generate the variable apparatus ID with a validity period based on app information corresponding to the app, a predetermined validity period, and a timestamp. In an alternative implementation, the mobile apparatus sends a variable apparatus ID and a user name to the server.

When the server executes the method for account login shown in FIG. 2, the server can determine whether the variable apparatus ID needs to be updated; and if determining that the variable apparatus ID needs to be updated, the server sends an updated variable apparatus ID to the mobile apparatus; or if determining that the variable apparatus ID does not need to be updated, the server sends the original variable apparatus ID to the mobile apparatus. After determining that the variable apparatus ID is not within the validity period, the server updates the variable apparatus ID; or after or when identifying corresponding user account information from the user account database, the server updates the variable apparatus ID. Therefore, in S320, after the variable apparatus ID is successfully verified by the server, the mobile apparatus receives, from the server, a variable apparatus ID processed by the server and an account login permission instruction.

The method for account login executed by the server and the method for account login executed by the mobile apparatus are separately described above with reference to FIG. 2 and FIG. 3. A mobile apparatus and a server according to example implementations of the present application are described below with reference to FIG. 4 and FIG. 5.

Figure 4:
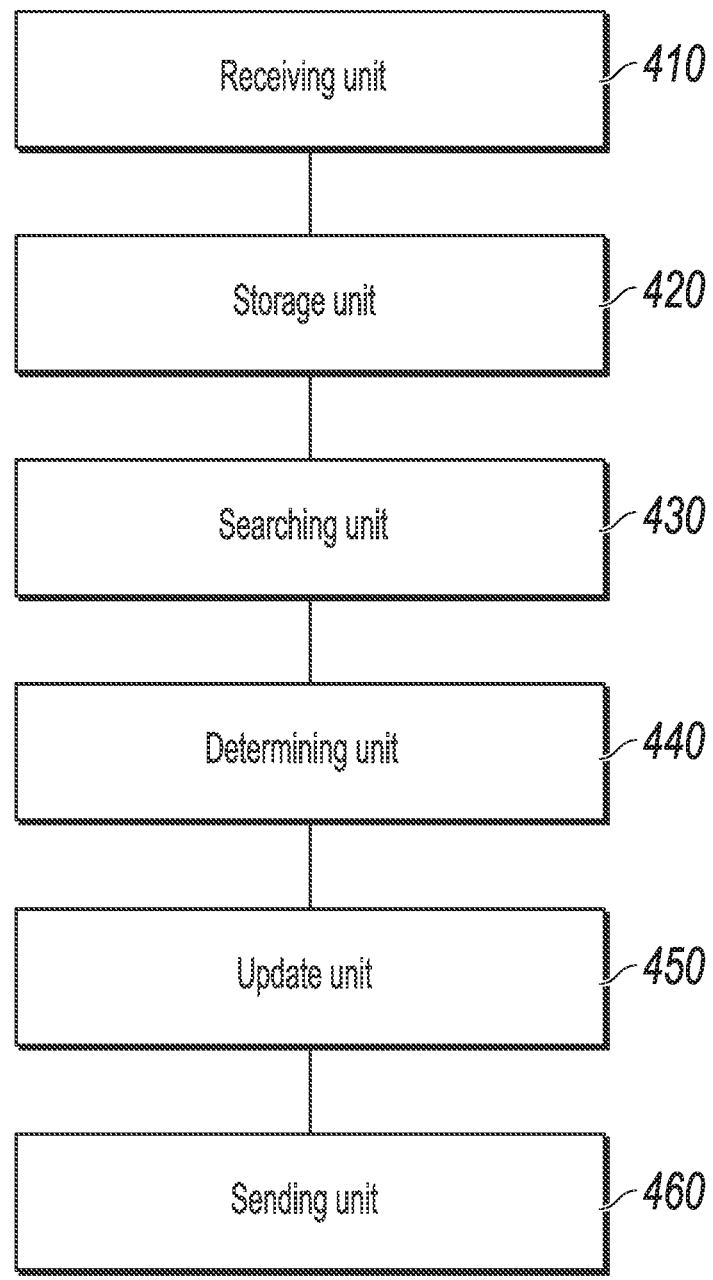
FIG. 4 is a block diagram illustrating a server, according to an example implementation of the present application.

FIG. 4 is a block diagram illustrating a server, according to an example implementation of the present application. The server according to this example implementation can include a receiving unit 410, a storage unit 420, a searching unit 430, a determining unit 440, an update unit 450, and a sending unit 460.

The receiving unit 410 receives a login request from a mobile apparatus, where the login request includes a variable apparatus ID. The variable apparatus ID has a validity period and can identify the mobile apparatus. The storage unit 420 stores a user account database, where a mapping relationship between an apparatus ID and a variable apparatus ID, a mapping relationship between the variable apparatus ID and a user name, and a mapping relationship between the apparatus ID and the user name are stored in the user account database.

The searching unit 430 searches the user account database for user account information corresponding to the variable apparatus ID. Specifically, the searching unit 410 searches the user account database for an apparatus ID corresponding to the variable apparatus ID. In an alternative implementation, when the login request includes a variable apparatus ID and a user name, the searching unit 410 searches the user account database for an apparatus ID corresponding to the variable apparatus ID, and determines whether the user name is a user name corresponding to the apparatus ID. The determining unit 440 determines, based on a timestamp in the variable apparatus ID and a current time of the server, whether the variable apparatus ID needs to be updated. When the determining unit 440 determines that the variable apparatus ID needs to be updated, the updating unit 450 updates the variable apparatus ID. Then, the sending unit 460 sends an account login permission instruction and an updated variable apparatus ID to the mobile apparatus. If the determining unit 440 determines that the variable apparatus ID does not need to be updated, the sending unit 460 sends an account login permission instruction and the variable apparatus ID to the mobile apparatus.

In an alternative implementation, after the update unit 450 updates the variable apparatus ID, the storage unit 420 can update the user account database by using the updated variable apparatus ID.

In an alternative implementation, the server can exclude a determining unit, that is, the server includes only a receiving unit, a storage unit, a searching unit, an update unit, and a sending unit. After the searching unit searches the user account database for user account information corresponding to the variable apparatus ID, the server does not need to determine whether the variable apparatus ID needs to be updated, but directly updates the variable apparatus ID by using the update unit.

Figure 5:
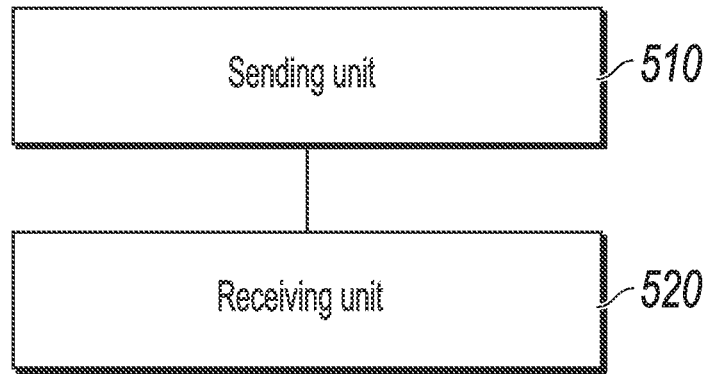
FIG. 5 is a block diagram illustrating a mobile apparatus, according to an example implementation of the present application.

FIG. 5 is a block diagram illustrating a mobile apparatus, according to an example implementation of the present application. The apparatus for account login (the previous "mobile apparatus") according to this example implementation includes a sending unit 510 and a receiving unit 520.

The sending unit 510 sends a login request to a server, where the login request includes a variable apparatus ID. The receiving unit 520 receives, from the server, a variable apparatus ID processed by the server and an account login permission instruction.

According to this example implementation, the variable apparatus ID processed by the server is an updated variable apparatus ID when the server determines that the variable apparatus ID needs to be updated or the existing variable apparatus ID when the server determines that the variable apparatus ID does not need to be updated.

According to the method, apparatus and server for account login in the present application, in the automatic login process, a variable apparatus ID is used to replace an apparatus ID and the variable apparatus ID is updated based on a condition, so that the apparatus ID is prevented from being exposed to the mobile apparatus for a long time period, and security is improved. Further, both a variable apparatus ID and a user name can be used in the automatic login process, so that the user can log in to an expected account by using the same mobile apparatus, and user experience is improved. Moreover, a validity period of the variable apparatus ID can be set based on a type of an app corresponding to a login account, so that different apps have different validity periods, and a personalized service is provided.

A person skilled in the art should understand that an implementation of the present application can be provided as a method, a system, or a computer program product. Therefore, the present application can use a form of hardware only implementations, software only implementations, or implementations with a combination of software and hardware. Moreover, the present application can use a form of a computer program product that is implemented on one or more computer-usable storage media (including but not limited to a disk memory, a CD-ROM, an optical memory, etc.) that include computer-usable program code.

The present application is described with reference to the flowcharts and/or block diagrams of the method, the device (system), and the computer program product based on the implementations of the present application. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so that the instructions executed by the computer or the processor of the another programmable data processing device generate a device for implementing a specified function in one or more processes in the flowcharts and/or in one or more blocks in the block diagrams.

These computer program instructions can be stored in a computer readable memory that can instruct the computer or the another programmable data processing device to work in a specific way, so that the instructions stored in the computer readable memory generate an artifact that includes an instruction device. The instruction device implements a specific function in one or more processes in the flowcharts and/or in one or more blocks in the block diagrams.

These computer program instructions can be loaded onto the computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (CPU), one or more input/output interfaces, one or more network interfaces, and one or more memories.

The memory can include a non-persistent memory, a random access memory (RAM), a non-volatile memory, and/or another form in a computer readable medium, for example, a read-only memory (ROM) or a flash memory (flash RAM). The memory is an example of the computer readable medium.

The computer readable medium includes persistent, non-persistent, movable, and unmovable media that store information storage by using any method or technology. The information can be a computer readable instruction, a data structure, a program module, or other data. Examples of a computer storage medium include but are not limited to a phase-change random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage or another magnetic storage device, or any other non-transmission medium. The computer storage medium can be used to store information accessible by the computing device. Based on the definition in the present specification, the computer readable medium does not include transitory computer readable media (transitory media), for example, a modulated data signal and carrier.

It is worthwhile to further note that the term "include", "comprise", or their any other variant is intended to cover a non-exclusive inclusion, so that a process, a method, a product, or a device that includes a list of elements not only include those elements but also includes other elements which are not expressly listed, or further includes elements inherent to such a process, a method, a product, or a device. An element preceded by "includes a . . . " does not, without more constraints, preclude the existence of additional identical elements in the process, method, product, or device that includes the element.

A person skilled in the art should understand that an implementation of the present application can be provided as a method, a system, or a computer program product. Therefore, the present application can use a form of hardware only implementations, software only implementations, or implementations with a combination of software and hardware. Moreover, the present application can use a form of a computer program product that is implemented on one or more computer-usable storage media (including but not limited to a disk memory, a CD-ROM, an optical memory, etc.) that include computer-usable program code.

The previous descriptions are only implementations of the present application, and are not intended to limit the present application. A person skilled in the art can make various modifications and changes to the present application. Any modification, equivalent replacement, or improvement made without departing from the spirit and principle of the present application shall fall within the scope of the claims in the present application.

Figure 6:
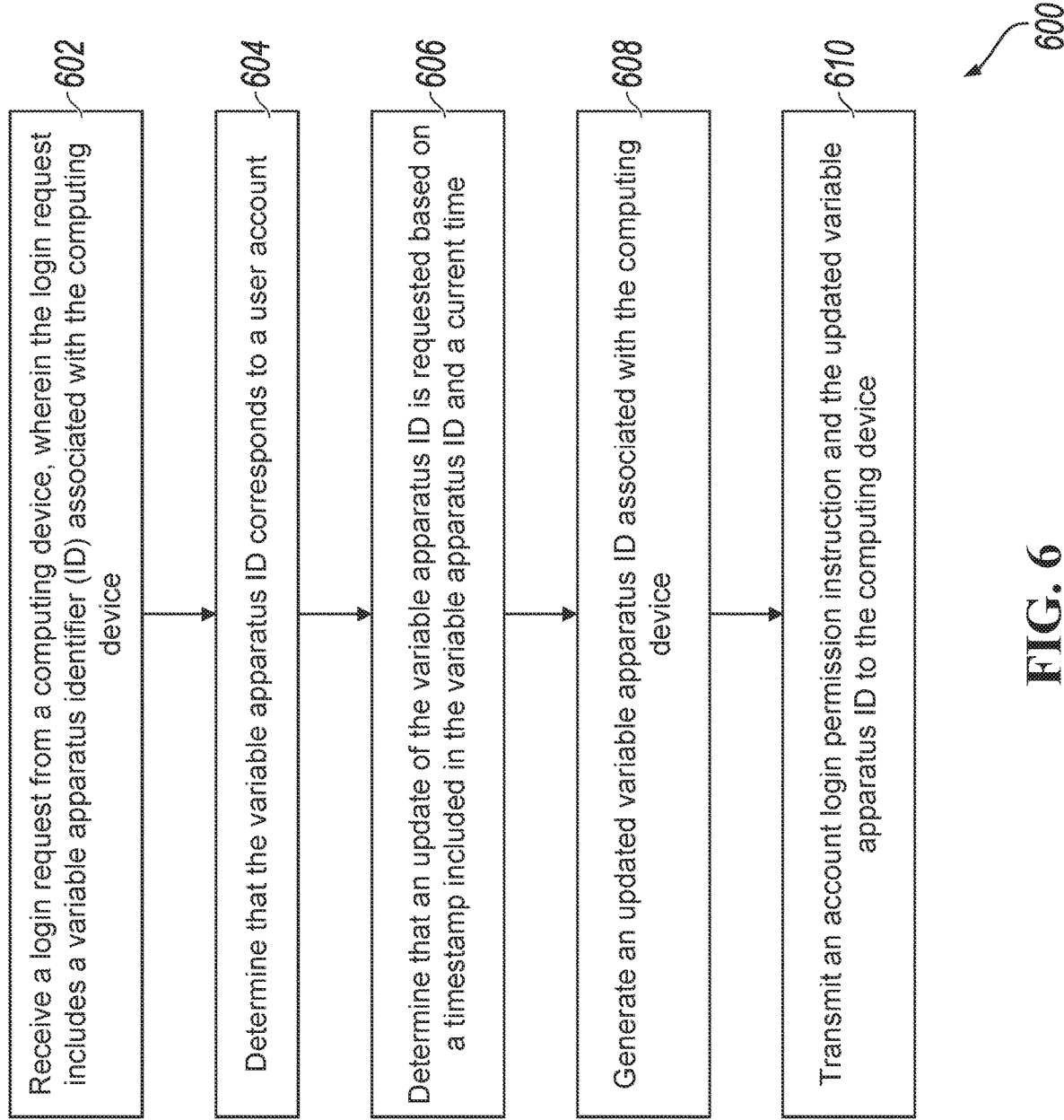
FIG. 6 is a flowchart illustrating an example of a computer-implemented method for secure authentication, according to an implementation of the present disclosure.

FIG. 6 is a flowchart illustrating an example of a computer-implemented method 600 for secure authentication, according to an implementation of the present disclosure. For clarity of presentation, the description that follows generally describes method 600 in the context of the other figures in this description. However, it will be understood that method 600 can be performed, for example, by any system, environment, software, and hardware, or a combination of systems, environments, software, and hardware, as appropriate. In some implementations, various steps of method 600 can be run in parallel, in combination, in loops, or in any order.

At 602, a login request is received from a computing device, wherein the login request includes a variable apparatus identifier (ID) associated with the computing device. In some cases, the variable apparatus ID is associated with a validity period and is configured to identify the computing device. In some implementations, the validity period of the variable apparatus ID corresponds to an app type. In some cases, the variable apparatus ID includes an apparatus token associated with a validity period. In some implementations, the updated variable apparatus ID is generated based on an application (app) executed by the computing device, an apparatus ID associated with the computing device, a validity period, and a timestamp. The apparatus ID can be a unique identifier generated based on terminal apparatus information associated with the computing device. In some cases, the login request includes a user name.

At 604, in response to receiving the login request, a determination is made that the variable apparatus ID corresponds to a user account. In some cases, determining that the variable apparatus ID corresponds to the user account includes searching a user account database that stores mapping relationships between apparatus IDs and variable apparatus IDs, between the variable apparatus IDs and user names, and between the apparatus ID and the user name.

At 606, in response to determining that the variable apparatus ID corresponds to a user account, a determination is made that an update of the variable apparatus ID is requested based on a timestamp included in the variable apparatus ID and a current time. determining that the update is requested comprises: determining a survival period associated with the variable apparatus ID based on the timestamp in the variable apparatus ID and the current time; determining that the survival period is longer than a validity period associated with the variable apparatus ID; and in response to determining that the survival period is longer than a validity period, determining that the update is requested. In some cases, searching the user account database includes searching the user account database for an apparatus ID corresponding to the variable apparatus ID. In some cases, searching the user account database includes searching the user account database for an apparatus ID corresponding to the variable apparatus ID, and determining whether the user name corresponds to the apparatus ID.

At 608, in response to determining that the update of the variable apparatus ID is requested, an updated variable apparatus ID associated with the computing device is generated.

At 610, an account login permission instruction and the updated variable apparatus ID are transmitted to the computing device.

In some cases, the login request is a first login request, the account login permission instruction is a first account login permission instruction, and the method 600 further comprises: receiving a second login request from the computing device, wherein the second login request includes the variable apparatus ID; determining that an update of the variable apparatus ID is not requested based on the timestamp included in the variable apparatus ID and the current time; and in response to determining that the update is not requested, sending a second account login permission instruction and the variable apparatus ID to the computing device. In some implementations, in response to generating the updated variable apparatus ID, the user account database is updated based on the updated variable apparatus ID.

The techniques described in this specification produce one or more technical effects. For example, the use of a variable apparatus ID rather than a static apparatus ID reduces the impact of an attacker gaining access to a particular apparatus and learning the variable apparatus ID. Because the variable apparatus ID can be changed periodically (e.g., at the end of a validity period) the attacker will not be able to continue to leverage the compromised variable apparatus ID indefinitely. This can lead to better security in systems employing variable apparatus ID according to the techniques described herein.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

The invention claimed is:

1. A computer-implemented method for secure authentication, the method comprising:
receiving, by a server and from a computing device, a first login request comprising a user name and a password corresponding to a user account and a variable apparatus identifier (ID) associated with the computing device, wherein the variable apparatus ID is generated by the server prior to the first login request based on a static apparatus ID and an additional parameter, and wherein the static apparatus ID is generated by the server based on attribute information of the computing device;
verifying, by the server, the user name and the password in the first login request;
in response to successful verification, storing, by the server and as stored mapping relationships, mapping relationships between the static apparatus ID and the variable apparatus ID, between the variable apparatus ID and the user name, and between the static apparatus ID and the user name;
receiving, by the server, a second login request from the computing device, wherein the second login request includes the variable apparatus ID, and wherein the second login request does not include the user name and the password;
in response to the receiving the second login request, identifying, based on the stored mapping relationships and by the server, the user account corresponding to the variable apparatus ID including identifying the static apparatus ID corresponding to the variable apparatus ID;
in response to the identifying the user account corresponding to the variable apparatus ID, determining, by the server, that an update of the variable apparatus ID is necessary based on a timestamp included in the variable apparatus ID and a current time;
in response to the determining that the update of the variable apparatus ID is necessary, updating, by the server, the variable apparatus ID associated with the computing device, wherein the updating the variable apparatus ID comprises replacing the variable apparatus ID with an updated variable apparatus ID, and wherein the updated variable apparatus ID is generated based on the static apparatus ID and an updated additional parameter; and
transmitting, by the server and to the computing device, an account login permission instruction that allows the computing device to log in to the user account and the updated variable apparatus ID as automatic login information for a next login request from the computing device to the server.

2. The computer-implemented method of claim 1, wherein the variable apparatus ID is associated with a validity period and is configured to identify the computing device.

3. The computer-implemented method of claim 2, wherein the validity period of the variable apparatus ID is based on an application type.

4. The computer-implemented method of claim 1, wherein the determining that the update of the variable apparatus ID is necessary comprises:
determining a survival period associated with the variable apparatus ID based on the timestamp in the variable apparatus ID and the current time;
determining that the survival period is longer than a validity period associated with the variable apparatus ID; and
in response to the determining that the survival period is longer than the validity period, determining that the update of the variable apparatus ID is necessary.

5. The computer-implemented method of claim 1, wherein the account login permission instruction is a first account login permission instruction.

6. The computer-implemented method of claim 1, wherein the variable apparatus ID includes an apparatus token associated with a validity period.

7. The computer-implemented method of claim 1, wherein the updated variable apparatus ID is generated based on an application executed by the computing device, the static apparatus ID associated with hardware of the computing device, a validity period, and a timestamp.

8. The computer-implemented method of claim 7, wherein the static apparatus ID is a unique identifier generated based on terminal apparatus information associated with the computing device.

9. The computer-implemented method of claim 8, wherein the identifying the user account corresponding to the variable apparatus ID includes searching a user account database that stores mapping relationships between static apparatus IDs and variable apparatus IDs, between the variable apparatus IDs and user names, and between the static apparatus IDs and the user names.

10. The computer-implemented method of claim 9, wherein the searching the user account database includes:
searching the user account database for the static apparatus ID corresponding to the variable apparatus ID.

11. The computer-implemented method of claim 9, further comprising:
in response to the updated variable apparatus ID being generated, updating the user account database based on the updated variable apparatus ID.

12. A non-transitory, computer-readable medium storing one or more instructions that when executed by a computer system cause the computer system to perform operations comprising:
receiving, by a server and from a computing device, a first login request comprising a user name and a password corresponding to a user account and a variable apparatus identifier (ID) associated with the computing device, wherein the variable apparatus ID is generated by the server prior to the first login request based on a static apparatus ID and an additional parameter, and wherein the static apparatus ID is generated by the server based on attribute information of the computing device;
verifying, by the server, the user name and the password in the first login request;
in response to successful verification, storing, by the server and as stored mapping relationships, mapping relationships between the static apparatus ID and the variable apparatus ID, between the variable apparatus ID and the user name, and between the static apparatus ID and the user name;
receiving, by the server, a second login request from the computing device, wherein the second login request includes the variable apparatus ID and wherein the second login request does not include the user name and the password;

in response to the receiving the second login request, identifying, based on the stored mapping relationships and by the server, the user account corresponding to the variable apparatus ID including identifying the static apparatus ID corresponding to the variable apparatus ID;

in response to the identifying the user account corresponding to the variable apparatus ID, determining, by the server, that an update of the variable apparatus ID is necessary based on a timestamp included in the variable apparatus ID and a current time;

in response to the determining that the update of the variable apparatus ID is necessary, updating, by the server, the variable apparatus ID associated with the computing device, wherein the updating the variable apparatus ID comprises replacing the variable apparatus ID with an updated variable apparatus ID, and wherein the updated variable apparatus ID is generated based on the static apparatus ID and an updated additional parameter; and transmitting, by the server and to the computing device, an account login permission instruction that allows the computing device to log in to the user account and the updated variable apparatus ID as automatic login information for a next login request from the computing device to the server.

13. The non-transitory, computer-readable medium of claim 12, wherein the variable apparatus ID is associated with a validity period and is configured to identify the computing device.

14. The non-transitory, computer-readable medium of claim 13, wherein the validity period of the variable apparatus ID is based on an application type.

15. The non-transitory, computer-readable medium of claim 12, wherein the determining that the update of the variable apparatus ID is necessary comprises:

determining a survival period associated with the variable apparatus ID based on the timestamp in the variable apparatus ID and the current time;

determining that the survival period is longer than a validity period associated with the variable apparatus ID; and in response to the determining that the survival period is longer than the validity period, determining that the update of the variable apparatus ID is necessary.

16. The non-transitory, computer-readable medium of claim 12, wherein the account login permission instruction is a first account login permission instruction.

17. The non-transitory, computer-readable medium of claim 12, wherein the variable apparatus ID includes an apparatus token associated with a validity period.

18. A computer-implemented system, comprising: one or more computers; and one or more computer memory devices interoperably coupled with the one or more computers and having tangible, non-transitory, machine-readable media storing one or more instructions that, when executed by the one or more computers, perform operations comprising:

receiving, by a server and from a computing device, a first login request comprising a user name and a password corresponding to a user account and a variable apparatus identifier (ID) associated with the computing device, wherein the variable apparatus ID is generated by the server prior to the first login request based on a static apparatus ID and an additional parameter, and wherein the static apparatus ID is generated by the server based on attribute information of the computing device;

verifying, by the server, the user name and the password in the first login request;

in response to successful verification, storing, by the server and as stored mapping relationships, mapping relationships between the static apparatus ID and the variable apparatus ID, between the variable apparatus ID and the user name, and between the static apparatus ID and the user name;

receiving, by the server, a second login request from the computing device, wherein the second login request includes the variable apparatus ID and wherein the second login request does not include the user name and the password;

in response to the receiving the second login request, identifying, based on the stored mapping relationships and by the server, the user account corresponding to the variable apparatus ID including identifying the static apparatus ID corresponding to the variable apparatus ID;

in response to the identifying the user account corresponding to the variable apparatus ID, determining, by the server, that an update of the variable apparatus ID is necessary based on a timestamp included in the variable apparatus ID and a current time;

in response to the determining that the update of the variable apparatus ID is necessary, updating, by the server, the variable apparatus ID associated with the computing device, wherein the updating the variable apparatus ID comprises replacing the variable apparatus ID with an updated variable apparatus ID, and wherein the updated variable apparatus ID is generated based on the static apparatus ID and an updated additional parameter; and transmitting, by the server and to the computing device, an account login permission instruction that allows the computing device to log in to the user account and the updated variable apparatus ID as automatic login information for a next login request from the computing device to the server.

* * * * *